(No Model.) 2 Sheets—Sheet 1.

P. McLAUGHLIN.
HARROW.

No. 590,529. Patented Sept. 21, 1897.

WITNESSES
H. Koerth.
J. C. Tappan.

INVENTOR
Patrick McLaughlin,
by John Wedderburn
Attorney

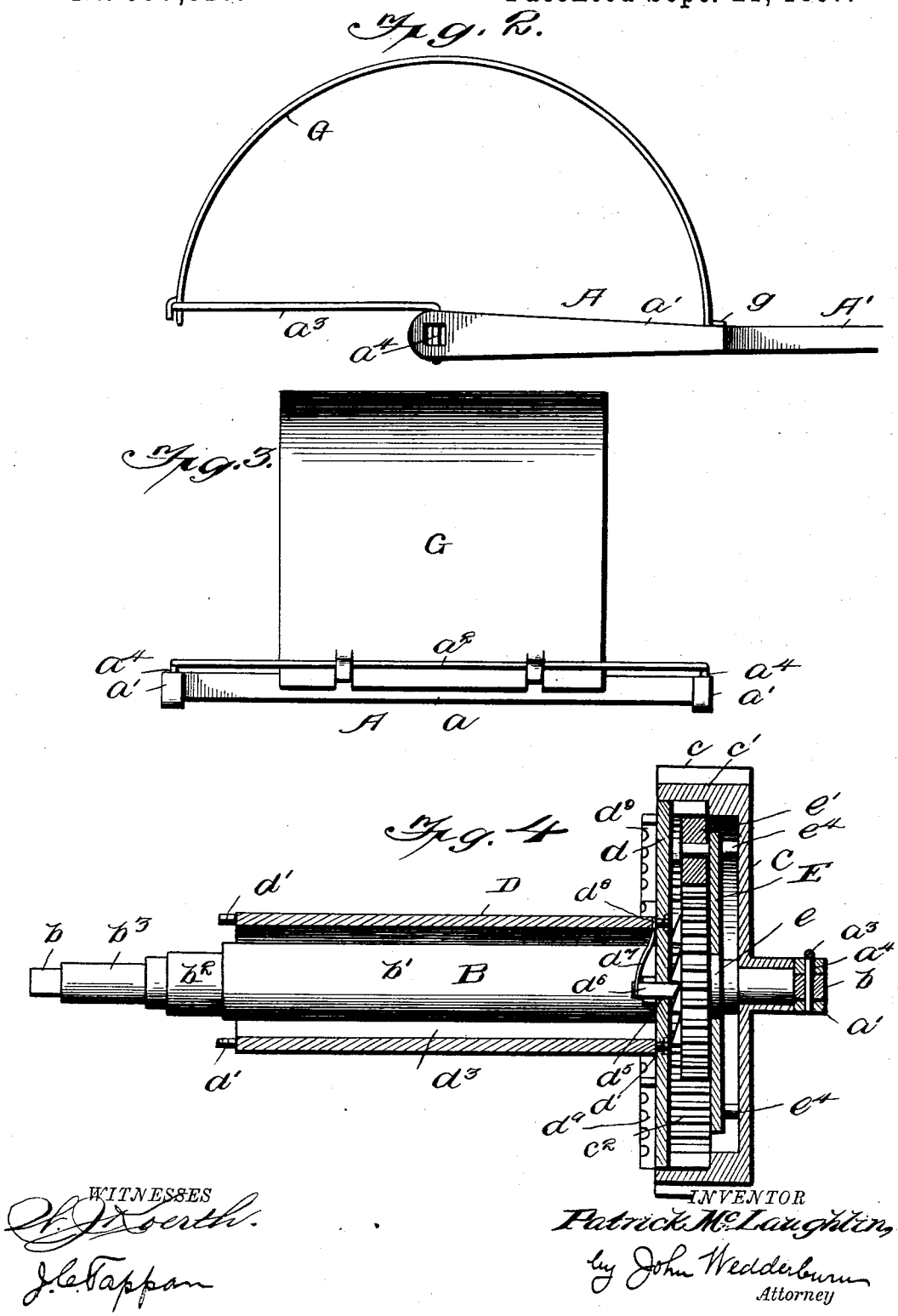

UNITED STATES PATENT OFFICE.

PATRICK McLAUGHLIN, OF DOVER, NEW HAMPSHIRE.

HARROW.

SPECIFICATION forming part of Letters Patent No. 590,529, dated September 21, 1897.

Application filed October 30, 1896. Serial No. 610,583. (No model.)

*To all whom it may concern:*

Be it known that I, PATRICK McLAUGHLIN, a citizen of the United States, residing at Dover, in the county of Strafford and State of New Hampshire, have invented certain new and useful Improvements in Harrows; and I do hereby declare the following to be a full, clear, and exact description of the invention, such as will enable others skilled in the art to which it appertains to make and use the same.

My invention relates to an improvement in land-cultivators, and more particularly to such class of these implements known as "revolving harrows."

My object is to provide such a harrow that the earth will be broken and the clods thoroughly crushed, while a further object is to provide an effective and convenient mechanism for operating the revolving parts.

To these ends the invention consists in the various matters hereinafter described and claimed.

Figure 1:
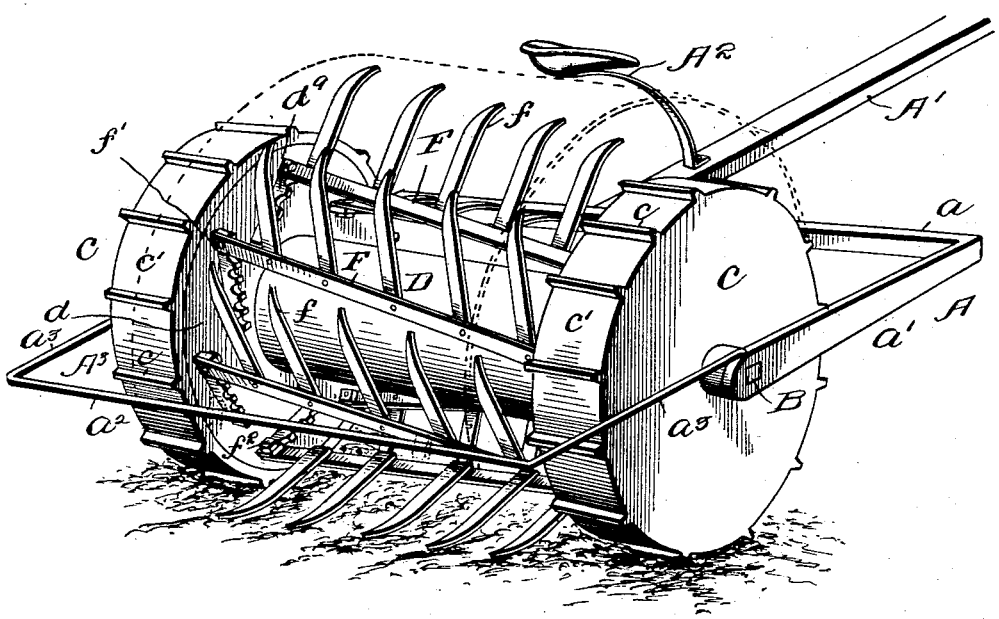
Figure 5:
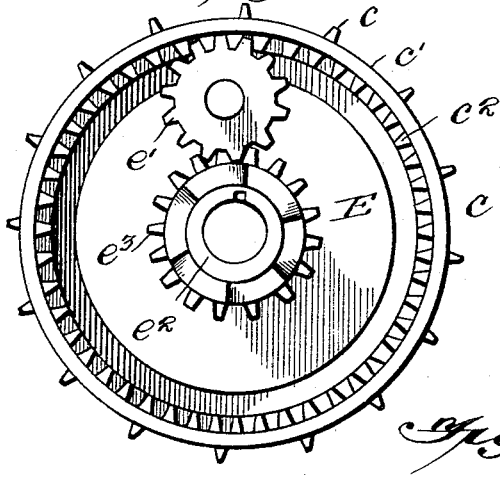
Figure 6:
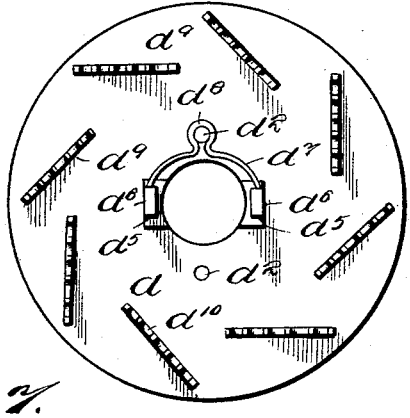
Figure 7:

In the accompanying drawings, which illustrate the invention, Figure 1 is a perspective of the present machine with the hood indicated in dotted lines. Fig. 2 is a side elevation of the frame with the hood attached. Fig. 3 is a rear view showing the manner of securing the hood to the rear member of the frame. Fig. 4 is a sectional elevation through the drum and shaft, one of the end plates, the wheel, and the attendant mechanism between the end plate of the wheel being removed. Fig. 5 is an elevation showing the interior of a wheel and the operating parts carried therein. Fig. 6 is a view of the inside face of one of the end plates, showing the manner in which the pawls are attached. Fig. 7 is a detail of one of the teeth-carrying bars.

Referring now more particularly to the drawings, A represents the frame of the present machine. This frame is provided with any convenient means, such as A', attached to the front bar $a$ of the frame, by which the draft attachment for the horse is secured.

Considering the machine in a general way, a shaft is carried by the frame, said shaft being held therein against rotation, and upon this shaft wheels are mounted to revolve thereon. A drum is also mounted upon the shaft between the wheels, said drum having revolution upon the shaft, and the harrow-teeth are connected to the drum. Between the wheels and the drum are gears, so that rotation of the wheels is transmitted to the drum, thus carrying the harrow-teeth to operate upon the ground. Preferably a hood is provided over the drum in such a manner as to prevent the harrow-teeth from throwing earth, &c. A suitable seat $A^2$ is provided upon the frame.

Passing now to the details of the present machine, side beams $a'$ extend backwardly from the front bar $a$, and seated in these side beams is a shaft B, said shaft being here shown with angular ends $b$, inserted in corresponding openings in the side beams, thus holding the shaft against rotation.

Preferably the shaft and side beams are held together by means of the rear member $A^3$ of the frame, said rear member being shown as formed of a rod, said rod extending across the machine substantially parallel with the front bar, as at $a^2$, side arms $a^3$ projecting from this portion $a^2$, said side arms having their ends bent downwardly to form pins $a^4$, which pins enter openings through the side beams and the shaft, thus holding said shaft firmly in position. As here shown, the shaft comprises a central portion $b'$, at the sides of which are reduced portions $b^2$, while outside of these reduced portions $b^2$ are further reduced portions $b^3$, which form axles for the wheels.

The wheels C are free to rotate upon their axles, and are preferably provided upon their outer peripheries with teeth $c$ in order to facilitate the rotation of the wheels. The tread of the wheel $c'$ is quite broad and extends inwardly some distance from the outer face of the wheel in order to form a casing adapted to receive an end of the drum and the operating connections between the wheel and the drum.

Rotatably mounted upon the central portion of the shaft is a drum D, said drum having upon its ends disks $d$, to which the harrow-teeth are adapted to be secured, said disks being of a size to lie within the rims of the wheels, and thus close the casings formed by said rims. Upon each of the reduced portions of the shaft $b^2$ is keyed a collar $e$, from which extends a plate E, adapted to lie within the casing of a wheel. The interior of the wheel-tread is provided with cogs $c^2$, while upon the plate E is journaled a pinion $e'$, adapted to gear with the cogs upon the interior of the wheel-tread. Thus rotation of the wheel transmits motion to the pinion. A collar $e^2$ is rotatably mounted upon the collar $e$, and upon this collar $e^2$ are provided cogs $e^3$, adapted to mesh with the cogs upon the pinion, so that rotation of the wheel is through the pinion imparted to the collar $e^2$. Pawls, to which reference will be more fully hereinafter made, are provided upon the ends of the drum D, and ratchets are formed upon the inner faces of the collars $e^2$, these ratchets being adapted to engage the pawls in the ends of the drum. The ratchets are formed in such a manner that forward movement of the machine causes the drum to be rotated in such a manner that the harrow-teeth operate upon the ground, while rear movement of the machine has no effect whatever in producing rotation of the drum. If desired, suitable posts $e^4$ can be provided upon the plate E, said posts being adapted to hold the plate at a suitable distance from the disk $d$, next to which it lies.

The ends of the drum are provided with threaded lugs $d'$, adapted to enter corresponding openings $d^2$ in the disks $d$, so that when the nuts are applied to these bolts the disks are firmly held upon the drum and rotate with the same. The drum has through it a cylindrical opening $d^3$ of somewhat greater diameter than the diameter of the shaft, while the disks $d$ have through them central openings of smaller diameter than the opening through the shaft, which openings $d^4$ in the disks form seats for the shaft. Each disk is provided with apertures $d^5$, through which operate pawls $d^6$, these pawls being of such width that they have free movement between the walls of the opening through the drum. Springs bearing upon the ends of the pawls hold them normally forced upwardly to be engaged by the ratchets on the collar $e^2$, but permit said pawls to yield in order to allow backward movement of the ratchets in the backward movement of the machine. As here shown, the springs for acting upon the pawls comprise each a piece of resilient material, such as spring-wire $d^7$, said wire being bent substantially semicircular to lie inside of the opening through the drum and having at about its central portion a loop $d^8$, adapted to fit over one of the lugs upon the end of the drum. Thus when the disk $d$ is secured upon the drum the spring for acting upon the pawls carried by said disk is held in position. Of course the pawls are attached to the free ends of the spring-wire $d^7$.

Plates $d^9$ extend from the inner faces of the disks $d$, and it is to these plates that the bars for carrying the harrow-teeth are attached, and in order to adjust the bars for the purpose of varying the depth to which the teeth will be inserted in the earth notches $d^{10}$ are provided upon the plates $d^9$. The bars F have the harrow-teeth $f$ secured to them in any suitable manner and are provided in their ends with slots $f'$, through which pass bolts $f^2$, by means of which a bar can be attached to the suitable plates upon the disks $d$ and adjusted upon said plates.

There remains to be considered the hood G and the manner of attaching the same to the frame. This hood may be of any suitable material, such as heavy sheet-iron, and is attached to the front bar by means of ears $g$, extending from the hood, through which ears and the front bar suitable bolts are inserted. At the rear the hood is hinged to the bar forming the rear member of the frame, so that by withdrawing the bolts from the ears on the front of the hood said hood can be swung backwardly and access had to the operating parts.

In operation forward motion of the machine causes the wheels to rotate, and by reason of the gears this rotation is transmitted to the drum carrying the harrow-teeth, the gears serving of course to multiply the rotations. When, however, the machine is backed, the pawls in the disks $d$ yield, and therefore no movement is transmitted to the drum by which the harrow-teeth are carried. The operation of the machine is positive, and, as will be seen, the earth is well harrowed and the clods broken.

When the present device is used as a harrow, the drum must revolve in the same direction as the wheels. In this case the teeth will strike the ground in front of the wheels and crush the clods. In order to cause the drum to revolve in the direction corresponding to the revolution of the wheels, there must be two pinions on the plate inside of the wheels, as shown. In order to reverse the action of the drum, the shaft and the frame should be turned backward, which can be done by moving the rod which holds the hood. In this case only one pinion is required, and the teeth will strike the ground in rear of the wheels, thus tearing up the land.

Having thus described my invention, what I claim as new, and desire to secure by Letters Patent, is—

1. A rotating harrow comprising a frame, a shaft fixedly mounted in said frame, wheels rotatably mounted upon said shaft, a drum rotatably mounted upon said shaft, plates fixed upon said shaft in proximity to the wheels, gears upon said wheels, gears upon said plates in mesh with the gears upon the wheels, gears upon the drum in mesh with the gears upon the plates, and harrow-teeth carried by the drum, substantially as described.

2. In a rotating harrow or the like, disks, means for rotating said disks, plates upon the inner sides of said disks, said plates being provided with notches, bars provided with slots in their ends, harrow-teeth carried by said bars, and bolts fitting in said slots adapted to engage the notches in the plates upon the disks, substantially as described.

3. In a rotating harrow or the like, a shaft, a drum rotatable on said shaft, harrow-teeth carried by said drum, a collar rotatable upon the shaft adjacent to the drum, ratchets upon the side of the collar next to the drum, pawls upon said drum adapted to be engaged by the ratchet, a rotatable drum, means for rotating the same, and harrow-teeth carried by said drum, and means for imparting movement to the collar, substantially as described.

4. In a rotating harrow or the like, a shaft, a drum fitting over said shaft and rotatable thereon, lugs extending from the end of said drum, a disk having openings therein corresponding to the lugs, a spring member having arms and a loop in its center adapted to fit over one of said lugs and be held in place between the end of the drum and the disk, pawls extending through the disk and attached to the ends of the spring, a ratchet-plate rotatable about the shaft and adapted to engage the pawls through the disk, and means for transmitting motion to the ratchet-plate, substantially as described.

In testimony whereof I have signed this specification in the presence of two subscribing witnesses.

PATRICK McLAUGHLIN.

Witnesses:
   NATHANIEL C. WENTWORTH,
   JOSEPH WINGATE.